UNITED STATES PATENT OFFICE.

FERDINAND LEROY, (FERDINAND LEROY, ADMINISTRATOR,) OF COMMERCIAL ROAD, LONDON, ASSIGNOR TO HIMSELF AND P. A. VICTOR LE LUBEZ, OF ENGLAND.

IMPROVED COMPOSITION FOR COVERING STEAM-BOILERS, AND FOR OTHER PURPOSES.

Specification forming part of Letters Patent No. 97,781, dated December 14, 1869.

*To all whom it may concern:*

Be it known that I, FERDINAND LEROY, of Commercial Road, London, in the county of Middlesex, England, have invented an Improved Non-Conducting Composition for Preventing the Radiation or Transmission of Heat or Cold, and an improved method of applying the same; and I hereby declare that the following is a full and exact description thereof.

My invention consists of certain additions to, and modifications in, the substances constituting, and the processes of treating, the said non-conducting composition, and in an improved method of applying the same.

My improved composition can be used as a substitute for mortar and cement in building or stopping up boilers or other steam-receivers with bricks; also for coating steam-boilers, locomotives, cylinders, steam-pipes, charcoal-filters, and other steam-receivers, and apparatus of any kind where it is required to prevent the radiation of heat. It may also be used for coating pumps, cylinders, pipes, and other utensils and apparatus for containing and conveying water and other liquids and beverages requiring to be protected from the external air, intense cold, and frost.

I prepare the improved non-conducting composition by mixing and combining brick-clay with powdered charcoal, sawdust, fuel-sweepings, cow-hair, cocoa-nut fiber, wheaten flour, yeast, or other fermentable substance, residues from the conversion of starch into sugar, and cotton foot oil, in the following manner:

In a vessel of suitable form and size, furnished with a stirring apparatus, I place about one hundred and twelve parts in weight of brick-clay, seventy parts in weight of powdered charcoal, twenty-eight parts in weight of sawdust, twenty-eight parts in weight of fuel-sweepings, eight parts in weight of cow-hair, eight parts in weight of cocoa-nut fiber, two parts in weight of wheaten flour, yeast, or other fermentable substance, eight parts in weight of the residues from the conversion of starch into sugar, eighty parts in weight of water, and thirty-six parts in weight of cotton-foot oil. The stirring apparatus is then put in motion, and as soon as these substances are well mixed and combined into a paste or mortar, I put the composition into a fermenting-vat, and submit it to a certain temperature, so as to cause fermentation, the result of which is a homogeneous self-adhesive substance, which is then ready to be used for the purposes hereinbefore described.

For covering marine and locomotive boilers, the fronts of horizontal boilers, and flat upright surfaces, I use, at certain distances between the first and second inch of the composition, hoop-iron, fastened at each end with screws. The object of this hoop-iron is to secure the equal adhesion of the composition, the hoop-iron undergoing the same expansion and contraction as the iron of the boiler.

What I claim as my invention, and desire to secure, is—

1. Certain additions to, and modifications in, the substances constituting the non-conducting composition.

2. The use of brick-clay, powdered charcoal, sawdust, fuel-sweepings, cow-hair, cocoa-nut fiber, wheaten flour, yeast, or other fermentable substance, the residues of the conversion of starch into sugar, and cotton-foot oil, in combination, so as to form a non-conducting composition.

3. The method of preparing the same by fermentation, and the method of applying the same as set forth in this specification.

London, March 20, 1868.

FERDINAND LEROY.

Witnesses:
  G. F. WARREN,
  T. L. WARNER,
*Both of No. 17 Gracechurch Street, London.*